Aug. 16, 1966   E. M. REESER   3,266,810
COMBINED FLUID WIPER AND SEAL
Filed May 4, 1964

INVENTOR:
ESRAL M. REESER
BY: Arthur J. Hansmann
ATTORNEY 3,266,810
COMBINED FLUID WIPER AND SEAL
Esral M. Reeser, Burlington, Iowa, assignor to J. I. Case Company, Racine, Wis., a corporation of Wisconsin
Filed May 4, 1964, Ser. No. 364,568
2 Claims. (Cl. 277—24)

This invention relates to a wiper and seal combination, and more particularly, it relates to a combination of a fluid seal and a wiper member disposed between two relatively movable parts.

This particular invention has application in the art of hydraulics wherein the usual hydraulic cylinder and piston are utilized for applying pressure against the piston in the nature of a hydraulic ram. In certain hydraulic applications, the environment is such that considerable sand and other dirt reaches the hydraulic system, and particularly the rod or ram which moves into and out of the cylinder, threefore the entire system is exposed to harmful dirt and other foreign particles. Of course such exposure is considerable in the agricultural implement field where many hydraulic rams are employed and the environment of the machinery is in conditions of exposure to sand and other dirt. Accordingly the present invention is conceived and provided for application in such circumstances, and it will of course be described in relation to the condition referred to.

Accordingly it is a general object of this invention to provide an improved hydraulic packing member for a hydraulic packing member for a hydraulic cylinder and piston combination. In this specific instance, the packing member includes the hydraulic seal member and the wiper member which both picks up and protects the moving parts from the dirt or the like.

Another object of this invention is to provide a combined seal member and wiper member which can be utilized in the well-known nature of a piston packing such that the seal member can have axial pressures applied thereto and the wiper member will sustain the pressures but still be useful in both its location and its function in wiping and maintaining the moving parts free of dirt.

Still a further object of this invention is to accomplish the aforementioned objects and to do so with a wiper member which also is useful in serving as a hydraulic seal under the surface of the hydraulic pressure applied thereto.

Still a more specific object of this invention is to provide a combined fluid seal member and wiper member wherein the seal member is particularly effective in a direction of movement of the part on which it is mounted, and wherein the wiper member is also directional in its effectiveness and with the two members being effective in the same direction so that the seal member is fully protected against the dirt which may be in the fluid system and the moving parts will therefore not be scratched by the dirt reaching the seal member which would otherwise carry the dirt in an exposed and harmful manner along the stationary part of the system.

Other objects and advantages become apparent upon reading the following disclosure in light of the accompanying drawing wherein.

Figure 1:
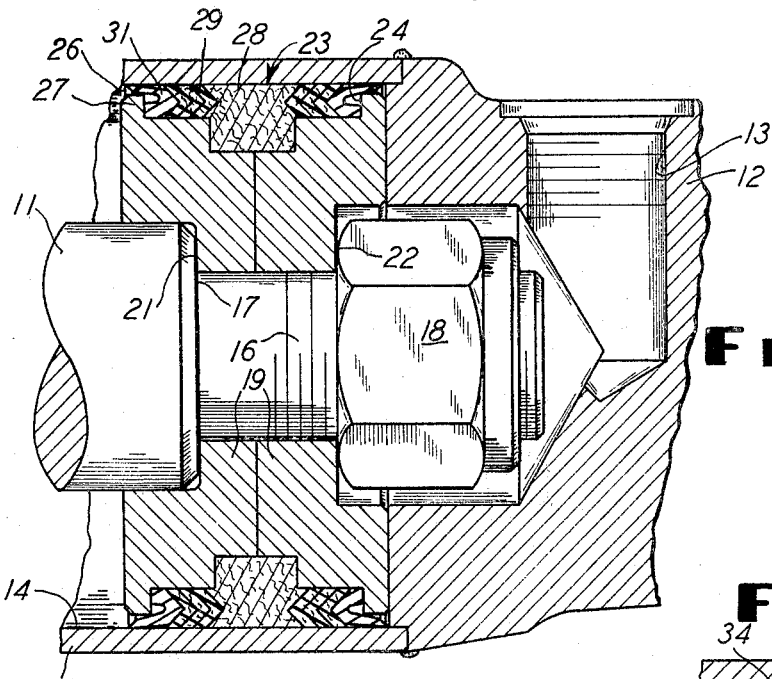
FIG. 1 is a longitudinal sectional view of a fragment of a hydraulic cylinder and piston with a preferred embodiment of the invention included therein.
Figure 2:
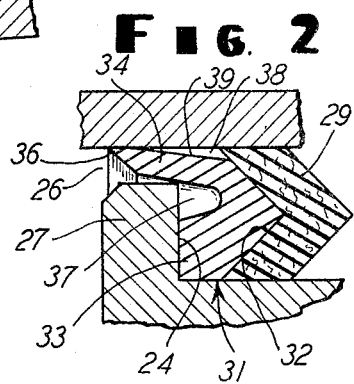
FIG. 2 is an enlarged sectional view of a fragment of the invention shown in FIG. 1.

A double acting hydraulic system is shown and it includes the cylinder 10 and the piston rod 11 and the cylinder head 12 which has the fluid passageway 13 extending into the interior wall 14 of the cylinder 10 all in the usual and well-known arrangement. The piston rod 11 of course has a threaded end 16 extending beyond its shoulder 17 and receiving a nut 18 which axially locates and retains two axially relatively movable parts 19 on the rod threaded end 16. Therefore the parts 19 have respective shoulders 21 and 22 which abut the rod shoulder 17 and the nut 18 to be forced toward each other upon adequate torqueing of the nut 18.

It will of course also be noted that the two parts 19 are radially spaced from the cylinder wall 14 to provide a pocket generally designated 23. Also the portions 19 have opposed annular walls 24 and an additional annular space indicated 26 is provided between the radial limits of the projection 27 of the portions 19 and the cylinder inner wall 14.

Disposed within the pocket 23 are a packing material 28 and a chevron type of fluid seal member 29 and a wiper ring 31. These members of course extend from the piston portion 19 and radially to the cylinder wall 14 to be in fluid tight and sliding contact with the wall 14. It will of course also now be noted that the chevron seal members 29 are provided in multiple numbers and disposed to face in the direction of piston movement on each end of the piston to be most effective in fluid sealing in that direction opposite to the direction of facing or incline of the chevron seals 29, all in the usual and well-known manner. Thus the chevron seals 29 are V-shaped and have their angular interior surfaces 32 disposed adjacent the wiper 31 and nested therewith so that the two members are disposed snugly together as shown in their angular configuration.

The wiper 31 includes the body portion 33 and the lip portion 34, and it will be noted that the body portion 33 extends for a substantial distance to approximately the height of the angle of the chevron seals 29. Also the lip 34 extends across the plane of the wall 24 and terminates in a feather edge or acute angle designated 36, and this edge of course rides on the cylinder wall 14 for the wiping action desired. An annular space designated 37 is thus provided between the body portion 33 and the lip portion 34, and this permits flexibility of the lip 34 and it also provides a pocket for retaining grit and foreign particles which will be wiped up by the lip portion in the movement of the piston. Also an outer annular pocket designated 38 and defined by the angular surface 39 on the wiper lip 34 is provided between the wiper and the cylinder wall 14. This pocket 38 also receives grit and foreign particles which may actually reach the pocket 38, and it is significant that the wiper 31 is made of a flexible but relatively hard material of nylon or the like so that the foreign particles will actually be imbedded in the wiper on the surface 39 when the piston is displaced. Thus it has been found that these particles will be picked up by the wiper and retained by the wiper to take them out of the hydraulic fluid as desired so that they will not scratch and otherwise injure the moving parts.

Accordingly the wiper 31 is of a flexible material with a hardness greater than that of the seal member 29. Also it is significant to note that the body portion 33 of the wiper is adequate to support sufficient compression of the packing so that the packing will move radially outwardly into fluid tight sealing relation with the cylinder walls. Of course this also provides for the radial adjustment of the packing for snug relationship with the cylinder wall as desired. The material in the chevron seal member is therefore of a neoprene type of fabric composition.

Figure 4:
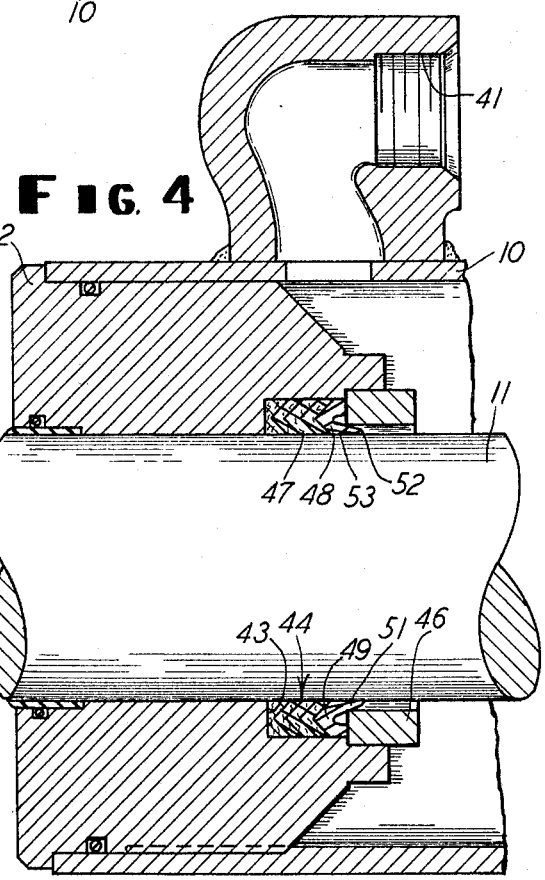
FIG. 4 is a longitudinal sectional view of the other end of the hydraulic cylinder and piston and showing the invention in another form applied thereto.
Figure 3:
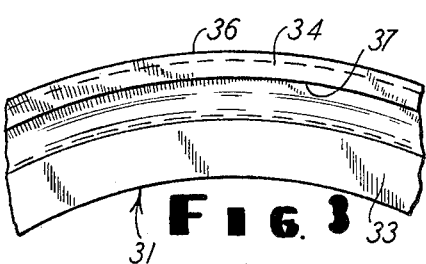
FIG. 3 is a front elevational view of a fragment of the wiper shown in FIG. 2.

FIG. 4 shows the other end of the cylinder 10 and rod 11, and here it will be noted that a fluid passageway 41 enters the cylinder 10 to provide the double acting cylinder as mentioned. Also the gland packing 42 is fitted inside the cylinder 10 and slidably receives the rod 11. The member 42 also has the annular pocket designated 43 for receiving the combined wiper and seal 44 which is retained in the pocket 43 by means of the nut 46 which can be threaded into the member 42. Thus the chevron seals 47 are disposed within the pocket, and the wiper member 48 is also disposed therein and these members are effective on the rod 11 to both wipe and fluid seal with respect to the rod. Here the wiper 48 has its body member 49 and its lip portion 51 with these portions being inverted with respect to the arrangement of the wiper as disclosed in the previous figures described. Of course in the instance shown in FIG. 4, the wiper 48 is stationary and therefore has its feather edge of the lip 51, as the edge is designated 52, disposed in a direction to pick up material from the sliding rod 11 to direct it either to the interior of the wiper 48 or to have the material imbed on the inner annular surface designated 53 on the wiper.

Accordingly the wiper can be applied on either a moving part or a stationary part but is of course applied between two relatively movable parts to get the foreign particles out of the working medium so that they will not damage the moving parts of the system.

While a specific embodiment of this invention has been shown and described, it should be obvious that certain changes could be made in the embodiment and the invention should therefore be determined only by the scope of the appended claims.

What is claimed is:

1. In a combined wiper and seal for use between two relatively movable and concentric parts operating in oil or the like and with one of said parts including two separable portions axially movable toward each other to a limit position of abutment and with said parts having a radial space therebetween and with said portions having shoulders facing each other and extending radially into said radial space, the combination of a wiper member and a seal member both being V-shaped in cross-section and nested together at the apexes of their shapes and with free ends of both extending toward the oil to be sealed, said members being disposed in said radial space and between said shoulders and being compressed into contact therebetween to have said seal member urged radially to fluid seal between said parts, said wiper member being spaced short of the radial extent of said seal member in the radial direction and at the location of the contact between said members and forming a pocket with the other of said parts, said free end of said wiper member being a beveled lip extending past the plane of one of said shoulders with a feather edge extending into relative sliding contact with the other of said parts for picking up dirt from the oil.

2. A wiper member and a fluid seal member combination for use between two relatively slidable parts with one of said parts consisting of two portions relatively movable and forming a pocket defined in part by a wall faced in the line of sliding movement, a chevron-shaped fluid seal member disposed in said pocket and spaced from said wall and extending to a limit in the direction oblique to the sliding movement and being of a pliable material sufficient to deform in response to the force of relative movement of said portions toward each other, a chevron-shaped wiper member disposed in the space adjacent said fluid seal member and said wall and including a body portion disposed on the face of said wall and being nested with said seal member and of a size sufficient to withstand the force created by movement of said portions, said wiper member including a lip portion extending from said body portion and said fluid seal and across the plane of said face of said wall and terminating in an edge with an acute angle, said body portion and said lip portion being spaced apart along said face of said wall and forming a closed pocket with said face in the extent therepast, and said wiper member being of a flexible material harder than said fluid seal member and with said lip portion being spaced from said limit of said fluid seal in said oblique directions and beng angled with respect to said sliding directon to present a relief on the outer surface of said lip portion for trapping particles of dirt in said closed pocket and for picking up particles of dirt pressed into said wiper member on said outer surface by the other of said parts.

References Cited by the Examiner

UNITED STATES PATENTS

| | | | |
|---|---|---|---|
| 2,431,796 | 12/1947 | Fall | 15—210.2 X |
| 2,795,195 | 6/1957 | Amblard et al. | 277—135 X |
| 3,132,568 | 6/1964 | Strader | 92—244 X |

FOREIGN PATENTS

| | | |
|---|---|---|
| 623,780 | 1/1933 | Germany. |

SAMUEL ROTHBERG, *Primary Examiner.*

WALTER A. SCHEEL, CHARLES A. WILLMUTH,
*Examiners.*

L. MACHLIN, *Assistant Examiner.*